United States Patent
Bolton et al.

[11] 3,976,087
[45] Aug. 24, 1976

[54] CLOSED MIXING SYSTEM FOR TENDING AGRICULTURAL SPRAYERS

[75] Inventors: Jack C. Bolton, Salinas; Franklin L. Alexander, Hollister, both of Calif.

[73] Assignee: Union Carbide Corporation, New York, N.Y.

[22] Filed: Aug. 11, 1975

[21] Appl. No.: 603,292

[52] U.S. Cl. ............................... 137/15; 137/205; 137/240; 137/263; 137/351; 141/59; 239/148; 239/172
[51] Int. Cl.² .......................................... B05B 7/28
[58] Field of Search ............... 137/205, 351, 263, 1, 137/15, 240; 141/59; 239/148, 172

[56] References Cited
UNITED STATES PATENTS

| | | | |
|---|---|---|---|
| 2,285,581 | 6/1942 | Horton | 137/351 X |
| 3,612,356 | 10/1971 | McVey | 239/172 |
| 3,640,319 | 2/1972 | Hougen | 137/205 X |
| 3,797,744 | 3/1974 | Smith | 239/172 |

*Primary Examiner*—Alan Cohan
*Attorney, Agent, or Firm*—Robert C. Brown

[57] ABSTRACT

A closed agricultural chemical batching, measuring and mixing system is disclosed for mounting to a sprayer tending truck. The system includes a measuring tank on which a partial vacuum is drawn by opening a connection to the intake manifold of the internal combustion engine of the truck. The measuring tank is in turn communicated to at least one manifold having numerous valve control inlets, all communicated to discrete agricultural chemical containers which can include highly toxic liquid chemicals. At the inlet remote from the mixing tank, the manifold communicates to a supply of surfactant. Preselected amounts of the liquid chemicals are sequentially drawn by the partial vacuum through the valve controlled manifold and to the measuring tank in which they are accumulated. The surfactant is then drawn through the manifold and into the measuring tank to flush the system. As the chemicals and surfactant are drawn into the measuring tank, the fumes created by the chemicals in the measuring tank are drawn into the intake manifold of the engine and rendered substantially nontoxic. After mixing of the liquid chemicals and surfactant in the measuring tank, the vacuum is broken and the batch is dumped through a dump valve at the bottom of the tank. Simultaneously, a stream of water is discharged from a water storage tank on the tending truck through a conduit to a spray tank on a tractor spraying rig. The measured batch is drawn into the stream of water at less than atmospheric pressure through an induction manifold interposed in the water conduit and diluted by the water. Provision is made to introduce wetable powders into the stream of water in addition to the liquid agricultural chemicals. Thus, a closed mixing system is provided for both liquid and powdered agricultural chemicals.

18 Claims, 7 Drawing Figures

CLOSED MIXING SYSTEM FOR TENDING AGRICULTURAL SPRAYERS

BACKGROUND OF THE INVENTION

This invention relates to agricultural chemical spraying. More particularly, this invention relates to a closed system under vacuum for mixing and diluting agricultural chemicals in the field to provide a spray mixture.

STATEMENT OF THE PROBLEM

Agricultural chemicals have always constituted a problem from a worker's safety standpoint to people who work in and around the agricultural chemical spraying industry. Many of these chemicals are extremely toxic in their concentrated liquid form if any contact is made with the worker's body. In addition, the fumes from such chemicals can be extremely toxic if inhaled or if the fumes contact the worker's eyes or sensitive, exposed skin areas.

In the agricultural chemical spraying industry, a single worker is usually provided with both a service or tending truck and a tractor spraying rig towed by the service truck over the highway. The worker goes alone at night to the fields to be sprayed and takes the tractor spraying rig from the service truck trailer. The concentrated chemicals and dilutant water are carried on the service truck and are mixed and loaded into the tractor spraying rig tanks. With most conventional systems, the loading and mixing of the chemicals is performed manually by the worker using open top containers. The service truck ordinarily carries sufficient chemicals to load the tractor spraying rig four or five times. The chemicals must be transferred to the tractor spraying rig tanks and mixed each time to load the tractor.

If the operator of the service truck and tractor spraying rig is extremely careful, follows all of the prescribed safety procedures and wears the appropriate protective equipment, the hazards involved in measuring and transferring the chemicals to the tractor spraying rig are minimized. However, the spraying operation is ordinarily performed at night, when the worker has less visibility and spilling of the chemicals is more difficult to detect. Also, the lack of supervision and the repetitive nature of the task results in inevitable variances from the recommended safety procedures. As a consequence, injury to such workers from the liquid chemicals themselves or their fumes is extremely common and has proved in the past to be an unavoidable hazard of such spraying techniques.

SUMMARY OF THE PRIOR ART

To alleviate some of these problems, "closed" agricultural chemical transfer systems have been proposed. Instead of the open containers traditionally used, such closed transfer systems utilize positive pressure which is above atmospheric to transfer the chemicals to a mixing area and onto the spraying tractor. Couplings must be provided between various tanks containing the concentrated agricultural chemicals, the mixing area and the tractor spraying rig, and it is inevitable that as such systems are subjected to use, leaks of the chemicals will occur. Because the system operates at greater than atmospheric pressure, the concentrated chemicals will be forced out of the system and will present an extreme hazard to operating personnel. Furthermore, the positive pressure will force fumes from the agricultural chemicals into the atmosphere surrounding the system, which again represents an extreme hazard to the operator of the system. Vacuum-type systems which operate at less than atmospheric pressure have been contemplated but have been considered unworkable because such systems would entail venting of the gaseous fumes to the atmosphere, which is unacceptable.

A frequent cause of premature failure in known closed agricultural chemical transfer systems is the metering of the chemicals as they are mixed into the system. Typically, positive displacement flow meters have been used to meter the highly corrosive agricultural chemicals. However, such meters almost always fail when they are used over prolonged periods of time under field conditions. Corrosion in occluded portions of the meter inevitably occurs and causes early and unsatisfactory meter failure.

SUMMARY OF THE INVENTION

The present invention provides a closed agricultural chemical batching, measuring and mixing system for mounting to a sprayer tending truck. The system includes a measuring tank on which a partial vacuum is drawn by opening a connection to the intake manifold of the internal combustion engine of the truck. The measuring tank is in turn communicated to at least one manifold having numerous valve control inlets, all communicated to discrete agricultural chemical containers which can include highly toxic liquid chemicals. At the inlet remote from the measuring tank, the manifold communicates to a supply of surfactant. Preselected amounts of the liquid chemicals are sequentially drawn by the partial vacuum through the valve controlled manifold and to the measuring tank in which they are measured. The surfactant is then drawn through the manifold and into the measuring tank to flush the system. As the chemicals and surfactant are drawn into the measuring tank, the fumes created by the chemicals in the measuring tank are drawn into the intake manifold of the engine and rendered substantially nontoxic.

After measuring of the liquid chemicals and surfactant in the measuring tank, the vacuum is broken and the batch is dumped through a dump valve at the bottom of the tank. Simultaneously, stream of water is discharged from a water storage tank on the tending truck through a conduit to a spray tank on a tractor spraying rig. The batch is drawn into the stream of water at less than atmospheric pressure through an induction manifold interposed in the water conduit and diluted by the water. Provision is made to introduce wetable powders into the stream of water in addition to the liquid agricultural chemicals. Thus, a closed mixing system is provided for both liquid and powdered agricultural chemicals.

The primary advantage of using a vacuum-type closed system, namely, the substantial reduction or elimination of leaks of the chemicals in their liquid or vapor form, has been known. However, the creation of the vacuum without venting the gaseous fumes directly into the atmosphere has heretofore been a problem. The present invention solves this problem by creating the vacuum with an internal combustion engine, preferably the engine used to power the tending truck, and conveying the fumes to that engine. In the engine, the high temperatures and pressures in the combustion chamber render the fumes substantially harmless and the exhaust of the engine is nontoxic. A liquid petroleum gas or propane engine is preferred because of the higher temperatures achieved in the combustion process which enhances the detoxification of such fumes.

In the system of the present invention, all handling of the liquid chemicals in their concentrated state, either before or after measuring, is performed at less than atmospheric pressure. The concentrated liquid chemicals are drawn into the measuring tank by the partial vacuum provided by the engine. The mixed concentrated chemicals are drawn into the water stream by the partial vacuum provided by the induction manifold. It is only after the chemicals are diluted to reduce their toxicity that positive pressure is applied to pump the dilute chemicals to the tractor spraying rig tanks.

In the preferred embodiment of the present invention the measuring tank is provided with a sight tube which indicates the amount of liquid contained in the tank. The chemicals are added serially to the measuring tank and the amounts thereof controlled by the operator who operates the valve controlled manifold while watching the sight tube. The necessity of using a positive displacement flow meter is thereby eliminated to reduce the likelihood of premature mechanical system failure.

Also in the preferred embodiment of the present invention, the various containers of the agricultural chemicals are provided with valve connections to a manifold which is in turn connected to the measuring tank. Flow of the various chemicals to the measuring tank is controlled at the valve connections to the manifold. One of the containers is provided with a surfactant, and the surfactant is drawn through the manifold and into the measuring tank after the other chemicals. The surfactant acts to flush the manifold and the connection to the measuring tank to minimize the amount of concentrated liquid chemicals left standing in the system. As a result, corrosion of all fittings in the system is greatly minimized.

Another feature of the preferred embodiment of the present invention is the use of a sealed spray tank on the spraying tractor for retaining the dilute mixed chemicals just prior to spraying. Known spraying tractors employ a spray tank which is not sealed so that the operator can determine when the tank has been filled. However, in the preferred embodiment of the present invention a float actuated valve is provided in the sealed spray tank which automatically cuts off the flow of dilute chemicals to the tank and thereby allows for the use of such a sealed tank.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

General Description

Figure 1:
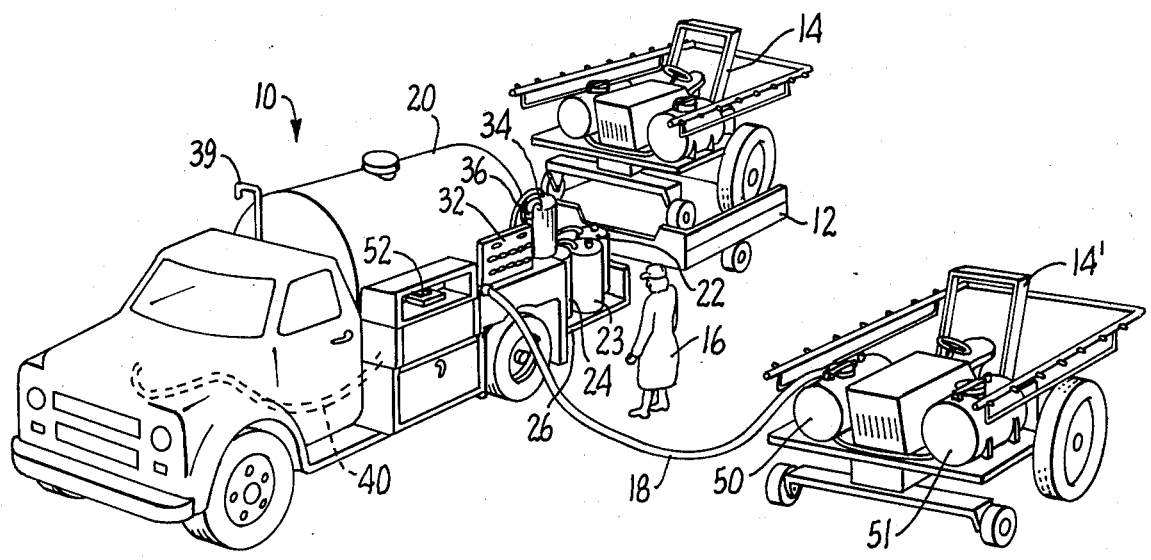
FIG. 1 is a perspective view of a sprayer tending truck and tractor spraying rig incorporating the system of the present invention.

A complete spraying apparatus embodying the chemical batching and measuring system of the present invention is illustrated by way of reference to FIG. 1. The apparatus includes a sprayer tending truck 10 hitched to a tow trailer 12. A tractor spraying rig 14 is mounted on trailer 12 for transportation along the highway, and is off loaded as illustrated at 14' from trailer 12 in the vicinity of the fields to be sprayed.

In the agricultural chemical spraying industry, a single operator 16 is provided with the sprayer tending truck 10 with the tractor sprayer rig 14 loaded on trailer 12. Operator 16 drives sprayer tending truck 10 to a point near the fields to be sprayed, usually late in the evening or shortly after nightfall. At the desired site, tractor spraying rig 14 is off loaded, connected to tending truck 10 by an umbilical 18 and loaded with a dilute mix of agricultural chemicals which are prepared on the tending truck and transferred to the spraying rig for spraying as desired. Spraying rig 14 is periodically reloaded throughout the night until the spraying operation is completed.

Sprayer tending truck 10 has a large water storage tank 20 containing water which is used as a dilutant. A plurality of smaller storage containers such as 22–24 are located on a platform 26 here shown at the back of tending truck 10. Each container 22–24 contains a concentrated agricultural chemical in liquid form and is sealed to prevent the escape of chemical vapors to the atmosphere.

Figure 2:
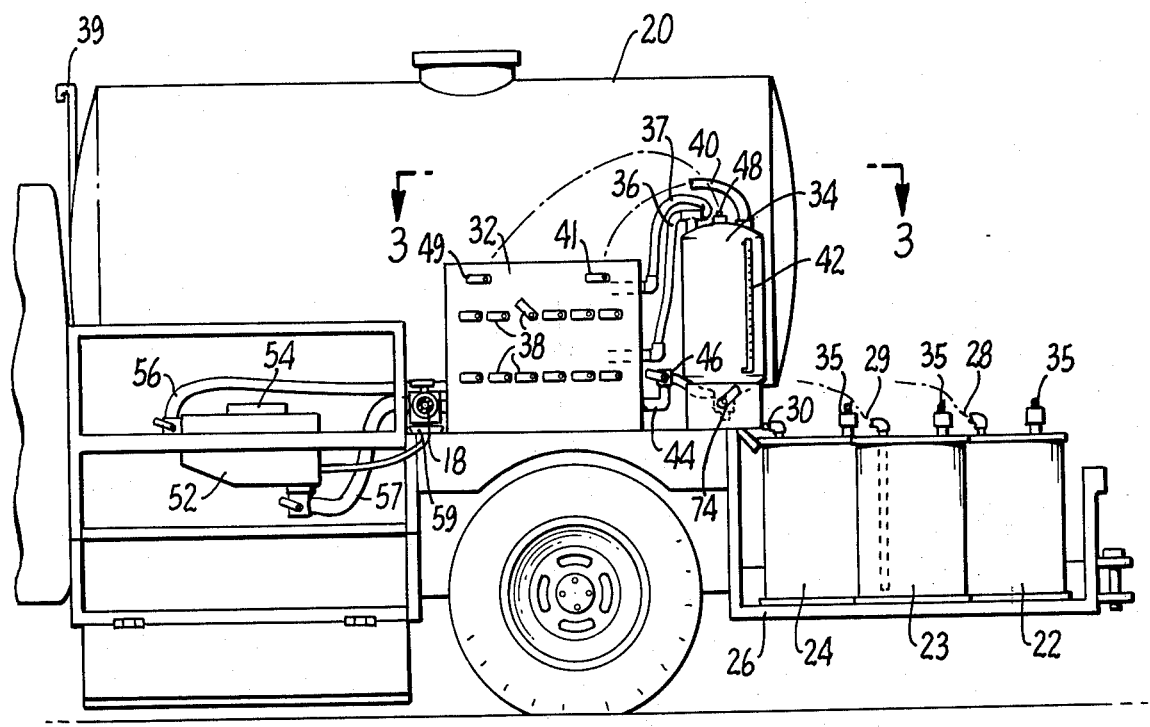
FIG. 2 is a side elevation view of the aft portion of the sprayer tending truck of FIG. 1.

As illustrated by FIGS. 1 and 2 in combination, a measuring tank 34 is provided adjacent a control station 32 on tending truck 10, and is connected thereto by conduits 36 and 37. Control station 32 is provided with a plurality of handles 38 which allow any one of the chemical supply containers 22–24 to be placed in communication with the measuring tank 34 by way of conduits 36 or 37. For reasons which will become apparent hereinafter, only one lever 38 is actuated at any one time so that only one of the liquid chemical containers 22–24 is communicated with measuring tank 34 at one time.

A conduit 40 is provided which leads from the top of measuring tank 34 through valve 41 to the intake manifold of the engine on sprayer tending truck 10. When the engine of the tending truck is running, valve 41 is opened and a partial vacuum will be drawn on conduit 40 and measuring tank 34. As a result of this vacuum, a liquid agricultural chemical will be drawn from one of the containers 22–24 and into measuring tank 34 depending on which lever 38 on control station 32 is actuated. As containers 22–24 are emptied, air is drawn into the containers through vents 35 connected to an intake 39 remote from the operator's station.

Several of the liquid chemicals contained in containers 22–24 are sequentially drawn into measuring tank 34 in preselected proportions. Measuring tank 34 is provided with a sight tube 42 which indicates the amount of liquid contained in the measuring tank. Operator 16 watches sight tube 42 as he manipulates the levers 38 on control station 32 to draw the preselected amounts of liquid chemicals into measuring tank 34. The chemicals in tank 34 are allowed to accumulate to provide the desired chemical quantities.

One of the liquid chemical containers 22–24 is provided with a surfactant which acts as a chemical flushing and rinsing agent. After the desired liquid chemicals have been drawn into mixing tank 34, a quantity of surfactant is drawn into the measuring tank. It is desired that the surfactant be connected with the remote ends of control station 32 so that the surfactant flushes the entire system to minimize corrosion and decrease the amount of concentrated liquid chemicals remaining in the system in the event of a mechanical failure.

After the desired chemicals and surfactant have been drawn into measuring tank 34, the mixture is ready to be transferred to off loaded sprayer tending truck 14'. Umbilical 18 is connected through pump 84 and induction manifold 80 with a conduit 44 connected to the bottom of measuring tank 34. Valve 46 is opened along with vent 48 controlled by valve 49 to break the vacuum in measuring tank 34 and allow the chemical mixture to flow into conduit 44. In conduit 44, the concentrated liquid chemical mixture is mixed in a stream of water from storage tank 20 at induction manifold 80, as illustrated in more detail hereinafter, to dilute the chemical mixture. The dilute chemical mixture is pumped through umbilical 18 to sealed storage tanks 50, 51 on off loaded rig 14'.

As the liquid chemical mixture from measuring tank 34 is transferred to off loaded tractor sprayer rig 14', it may be desirable to add powdered chemicals as well. Such powdered chemicals are ordinarily not toxic, and thus special handling is not required. The chemicals are placed in a powder box 52 through a preferably watertight door 54 which is then closed and sealed. A portion of the water from storage tank 20 is circulated through powder box 52 by lines 56, 57. The powder is thus mixed or suspended in the water, and the water containing both the mixed powdered chemicals and the dilute liquid chemical mixture passes through umbilical 18 to storage tanks 50, 51 on off loaded spraying tractor rig 14'. Any spill at the connection of the umbilical to the service truck is collected in pan 59 and returned to powder box 52.

After storage tanks 50, 51 which are interconnected on off loaded tractor spraying rig 14' are full, further passage of water or chemicals through umbilical 18 is terminated, as illustrated in more detail hereinafter. Umbilical 18 is disconnected from tractor spraying rig 14' and the dilute chemical mixture sprayed as desired. Sprayer tending truck 10 ordinarily contains sufficient concentrated chemicals and dilutant water to resupply tractor spraying rig 14 several times throughout the night.

CONTROL AND MEASURING STATION

Figure 3:
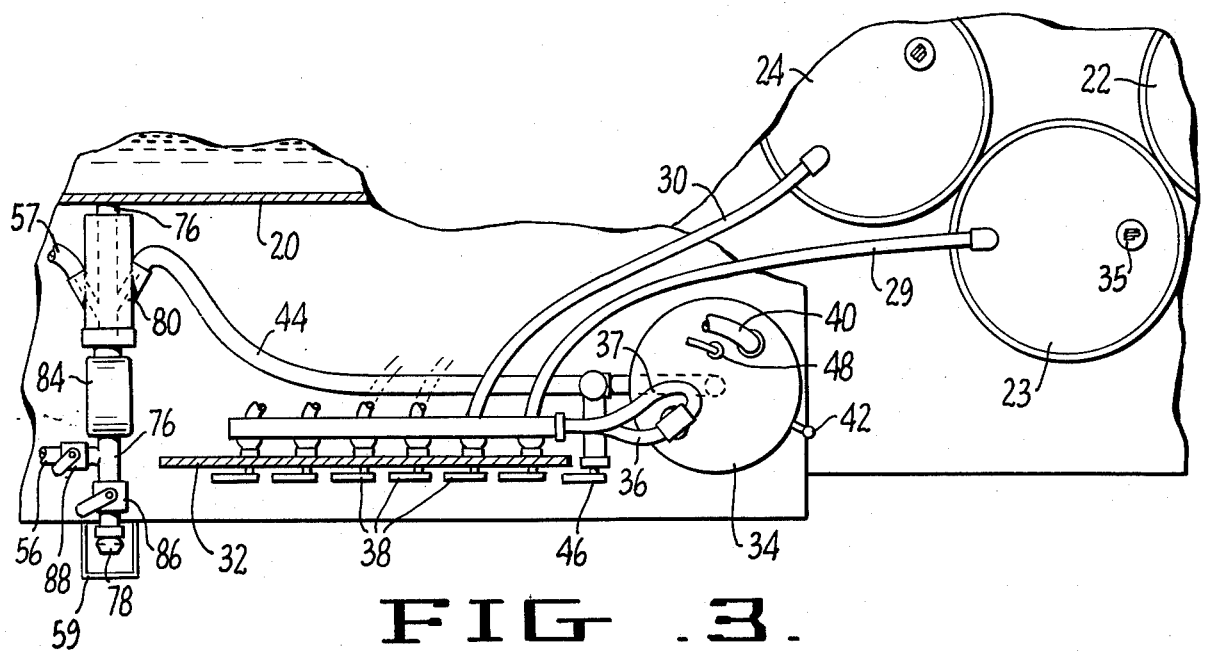
FIG. 3 is a fragmentary plan view of the control system on the sprayer tending truck of the present invention taken along lines 3—3 of FIG. 2.
Figure 4:
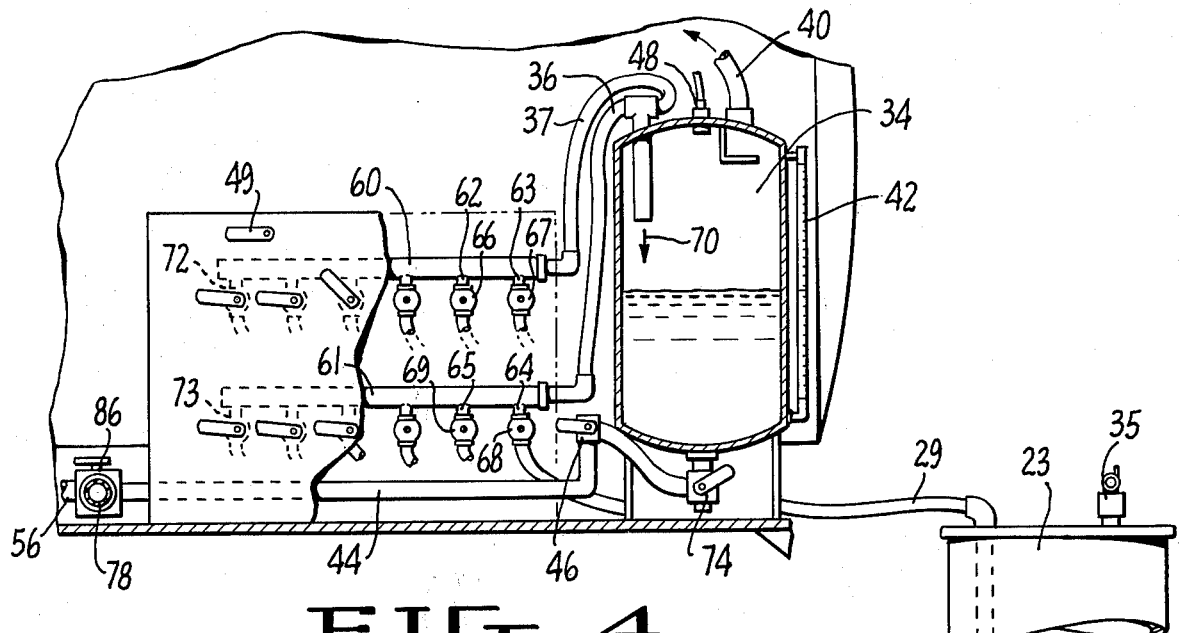
FIG. 4 is an elevation and partially broken away view of the apparatus of FIG. 3.

The control station 32 on sprayer tending truck 20 is illustrated in more detail by way of reference to FIGS. 3 and 4 in combination. Liquid chemical containers 22–24 are connected to at least one of two manifold pipes 60, 61 by conduits such as 29, 30. In the example here shown two manifold pipes 60, 61 include a plurality of inlet stations such as 62–65 corresponding with individual liquid chemical containers. Each inlet station 62–64 is provided with a valve 66–69 operated by one of the handles 38 on control panel 32.

Manifold pipes 60, 61 are connected to conduits 36, 37 leading to the interior of measuring tank 34. As discussed hereinabove, the chemicals are drawn into the interior of measuring tank 34 as illustrated by arrow 70 in sequence by manipulating levers 38 controlling valves such as 66–69. The liquid chemicals are drawn into measuring tank 34 one at a time in preselected amounts as indicated by calibrated sight tube 42 until the desired concentrated liquid chemical mixture is obtained. The surfactant is connected to the remote inlet stations 72, 73 of manifold pipes 60, 61 respectively. After the desired liquid chemical mixture has been obtained, the surfactant is drawn through the system, including the entire length of manifold pipes 60, 61 and conduit 36, to flush the system.

It should be noted that any remaining liquid in the system can be drained by opening valve 74. Such liquid remaining in the system should be sufficiently diluted by surfactant so as to be nontoxic and can be disposed of at designated dumping sites.

A conduit 76 is connected to water storage tank 20 and terminates at a coupling 78 adapted to be connected to the umbilical illustrated in FIG. 1. Conduit 76 is provided with a induction manifold section 80. Conduit 44 emanating from the dump valve 46 at the bottom of measuring tank 34 is connected to induction manifold 80.

Water from storage tank 20 is pumped through conduit 76 and into the umbilical leading to the tractor spraying rig by pump 84 to extract and dilute the chemical mixture in measuring tank 34 and transfer it to spraying rig 14'. Valve 86 is open for this purpose. As the water is being pumped, induction manifold 80 will draw a partial vacuum on conduit 44. Dump valve 46 is opened together with air vent 48 so that the concentrated liquid chemicals in measuring tank 34 are drawn through conduit 44 under a partial vacuum and entrained in the water flowing through conduit 76 and onto the tractor spraying rig.

As is apparent in viewing FIG. 3, line 56 leading to the powder box 52 illustrated in FIG. 2 is connected to conduit 76 downstream of pump 84. When valve 88 is opened, water will be pumped into the powder box and circulated therethrough to entrain powdered chemicals contained therein into the liquid transfer system. The water containing the powdered chemicals is returned to conduit 76 through line 57. Line 57 is communicated to the induction manifold 80 to draw the water containing the wetable powder back to conduit 76 and to the tractor spraying rig.

Tractor Spraying Rig Spray Tanks

Figure 5:
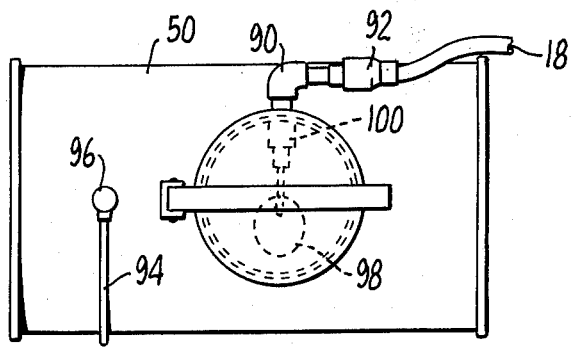
FIG. 5 is a plan view of one of the spray tanks on the tractor spraying rig.
Figure 6:
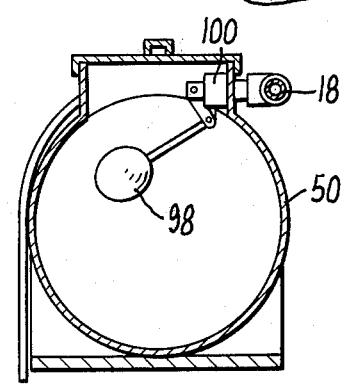
FIG. 6 is a sectional view of the apparatus of FIG. 5.

One spray tank 50 on the tractor spraying rig is illustrated by way of reference to FIGS. 5 and 6 in combination. Spray tank 51 on the tractor spraying rig is similar and has similar features. Spray tanks 50, 51 which are interconnected are filled with the dilute chemical mixture to load the tractor spraying rig.

Umbilical 18 is connected to a conduit 90 leading to the interior of one of the spray tanks by releasable coupling 92. As the water containing the dilute chemical mixture is being loaded in the spray tank by umbilical 18, the air and other fumes in tank 50 are vented through a tube 94 which leads downwardly from an outlet 96 at the top of the tank to a position near the ground. The fumes and any possible liquid overflow are far less toxic at this stage because they are now diluted, but the venting of such fumes and any possible overflow onto the ground rather than at the top of the tank further minimizes the safety hazard to the operator.

Spray tank 50 is sealed with the exception of vent tube 94. Consequently, a float 98 is provided which is connected to a valve 100 at the downstream end of conduit 90. When the level of the liquid in spray tank 50 reaches a predetermined level, float 98 actuates valve 100 to terminate the flow of such liquid to the tank. Pump 84 illustrated in FIG. 3 is of a non-positive displacement type, here shown as a centrifugal pump, so that termination of the liquid flow at the far end of the umbilical will not damage the pump. After termination of the liquid flow, pump 84 is turned off by the operator.

Operation

Figure 7:
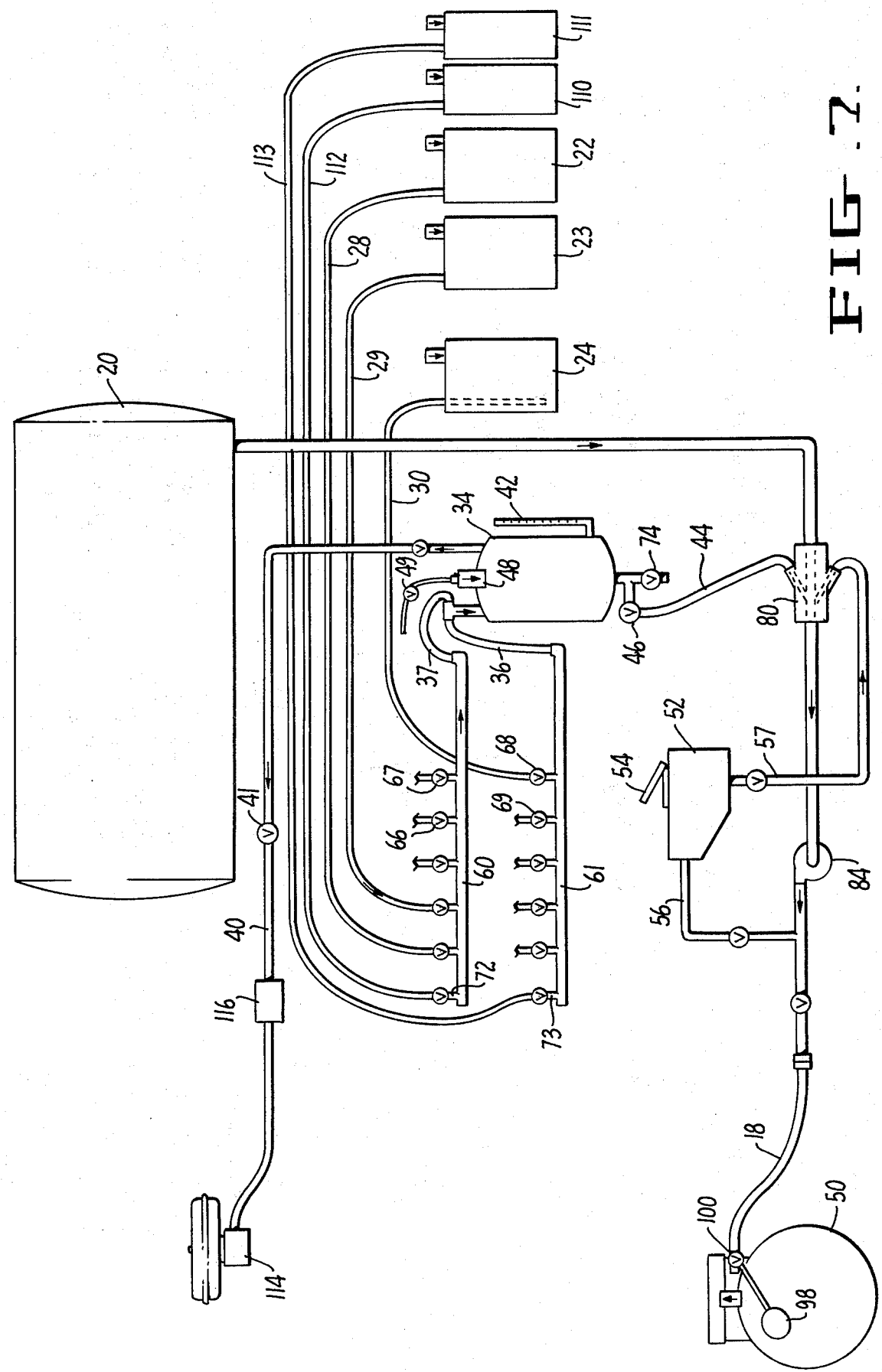
FIG. 7 is a schematic view of the system of the present invention.

The operation of the present invention is best illustrated by way of reference to the schematic view of FIG. 7. A plurality of containers 22–24 of concentrated liquid agricultural chemicals are connected to various inlet stations on manifold pipes 60, 61 by conduits 28–30. A quantity of surfactant in containers such as 110, 111 is connected to the remote inlet stations 72, 73 by two separate conduits 112, 113. Manifold pipes 60, 61 are connected to conduits 36, 37 leading to the top of mixing tank 34.

The liquid chemicals in containers 22–24 are drawn in series through one or the other of manifold pipes 60, 61, through conduits 36, 37 and into measuring tank 34. The particular liquid chemical being drawn into the measuring tank at any one time is controlled by valves such as 66–69, and the operator watches the calibrated sight tube 42 to obtain the right proportions. Surfactant is then drawn through the system from containers 110, 111 to flush manifold pipes 60, 61 and conduits 36, 37.

In order to draw the chemicals and surfactant into measuring tank 34, a partial vacuum is applied by connecting conduit 40 to the intake manifold 114 of the internal combustion engine which powers the sprayer tending truck and opening valve 41. A trap 116 is interposed in conduit 40 to trap particulate or liquid matter passing through the conduit to prevent it from reaching intake manifold 114. Preferably, provision is made to shut down the engine in the event the trap becomes full.

The gasses drawn from measuring tank 34 through conduit 40 include highly toxic fumes of the concentrated chemicals. These vapors pass into intake manifold 114 and thereafter into the combustion chambers of the engine. In the combustion chambers they are either combusted or subjected to high temperatures and pressures and shock fronts which render the chemical fumes substantially nontoxic.

It has been found that in internal combustion engines which are operated on propane, as opposed to gasoline, the combustion temperature in the engine is substantially higher than that achieved in a gasoline powered engine. As a result, detoxification of the chemical fumes is improved and it is therefore desirable to employ such an engine in the apparatus of the present invention. Even when a gaoline engine is used, the fumes are rendered substantially nontoxic and can be vented to the atmosphere through the vehicle exhaust.

After the desired concentrated liquid chemicals and the surfactant have been drawn into measuring tank 34, dump valve 46 and vent valve 49 are opened to release the vacuum. Water is pumped by pump 84 from storage tank 20 through umbilical 18 and to one of the spray tanks such as 50 on the tractor spraying rig. Conduit 44 emanating from dump valve 46 is connected to induction manifold 80 to draw the concentrated liquid chemicals into the water stream under partial vacuum and dilute them. Powdered chemicals can also be added by placing such chemicals in powder box 52 and cycling water through the powder box by way of lines 56, 57. Water containing the suspended powdered chemicals is also introduced to induction manifold 80 and is entrained in the water stream. When spray tank 50 on the tractor spraying rig is filled, float 98 actuates a valve 100 to terminate the flow of further liquid to the tank.

It is to be appreciated that the liquid chemicals in their concentrated form, and the fumes or vapors from such concentrated liquid chemicals, are highly toxic. After the chemicals are diluted, the diluted chemicals and their fumes are far less toxic. However, with the apparatus of the present invention, all of the handling of the liquid chemicals in their concentrated state is accomplished at less than atmospheric pressure. Not only is the drawing of the liquid chemicals into the measuring tank 34 accomplished at less than atmospheric pressure, but the introduction of the mixed chemicals in their concentrated state into the water stream is also accomplished in this manner. As a result, the likelihood of the concentrated liquid chemicals and their vapors escaping to the atmosphere is substantially reduced over positive pressure systems. The chemical fumes which are drawn from the system to provide the partial vacuum are fed to the combustion chambers of the internal combustion engine and rendered nontoxic. It is only after the liquid chemicals have been diluted that positive pressure is applied, e.g. by pump 84.

While a preferred embodiment of the present invention has been illustrated in detail, it is apparent that modifications and adaptations of that embodiment will occur to those skilled in the art. For example, the vacuum could be provided by an auxilliary engine rather than the engine that provides the motive power for the tending truck. However, it is to be expressly understood that such modifications and adaptations are within the spirit and scope of the present invention, as set forth in the following claims.

I claim:

1. A closed method of measuring, batching and mixing agricultural chemicals at a vehicle such as sprayer tending truck provided with an internal combustion engine, said method comprising the steps of drawing a vacuum on a measuring tank by providing a fluid connection between the measuring tank and the intake manifold of the internal combustion engine as said engine is running so as to draw the gaseous content of the measuring tank into said engine; providing a plurality of discrete liquid agricultural chemical supplies; and serially fluidly connecting at least several of the plurality of liquid chemical supplies to the measuring tank to draw preselected amounts of such chemicals in sequence into the measuring tank at less than atmospheric pressure to accumulate the chemicals in said tank and render the vapors produced by said chemicals in the tank substantially nontoxic by subjecting said vapors to combustion in the internal combustion engine.

2. A method as recited in claim 1 and additionally comprising the steps of drawing the accumulated chemicals from the measuring tank and into a flowing stream of water, and transferring the chemicals in said flowing stream of water to a spraying tractor.

3. A method as recited in claim 1 wherein said serially fluidly connecting step comprises serially fluidly connecting a plurality of the liquid chemical supplies to a manifold in fluid connection with the measuring tank, and additionally comprising the step of flushing the manifold by drawing a preselected amount of surfactant through said manifold subsequent to said serially fluidly connecting step.

4. A method as recited in claim 1 wherein said fluid connection providing step comprises the step of providing a fluid connection between the measuring tank and the intake manifold of the internal combustion engine comprising the motive power source of the sprayer tending truck.

5. A closed agricultural chemical batching, measuring and mixing system with a vehicle such as a sprayer tending truck provided with an internal combustion engine, said system comprising a measuring tank; gauge means for indicating the amount of liquid in the measuring tank; a plurality of liquid chemical supply containers each containing a liquid chemical; means for providing fluid communication between each of the liquid chemical supply containers and the measuring tank; valve means interposed in the providing means and adapted to control the flow of liquid chemicals from each of the liquid chemical supply containers to the measuring tank; and means for connecting the measuring tank to the intake manifold of the internal combustion engine to create a partial vacuum in the measuring tank and thereby draw preselected amounts of the selected chemicals controlled by the valve means in sequence from the containers and into the measuring tank and simultaneously render the chemical vapors formed in the measuring tank substantially nontoxic in the internal combustion engine.

6. A system as recited in claim 5 and additionally comprising a manifold in fluid communication with the measuring tank, and wherein the providing means comprises means for providing individual communication between each of the liquid chemical supply containers and said manifold.

7. A system as recited in claim 5 wherein one of the liquid chemicals comprises a surfactant, and wherein the fluidly connecting means includes means for fluidly connecting the measuring tank to the container containing the surfactant subsequent to the other selected chemicals to flush said fluidly connecting means.

8. A system as recited in claim 5 wherein said measuring tank includes a dump valve at the bottom thereof for introducing the chemicals into a water stream for conveyance of the mixed chemicals in the water stream to a spraying tractor.

9. A system as recited in claim 5 wherein the gauge means comprises a sight tube.

10. A system as recited in claim 5 wherein the internal combustion engine comprises the motive power source of the sprayer tending truck.

11. A system as recited in claim 5 wherein the internal combustion engine comprises a propane engine.

12. A system as recited in claim 5 wherein the system is mounted on said vehicle.

13. A closed method of batching, measuring and mixing agricultural chemicals at a vehicle such as a sprayer tending truck provided with an internal combustion engine for motive power, said method comprising the steps of drawing a vacuum on a measuring tank by providing a connection between the measuring tank and the intake manifold of the internal combustion engine as said engine is running so as to draw the gaseous content of the measuring tank into said engine; providing a plurality of discrete liquid agricultural chemical supplies; serially connecting the plurality of liquid chemical supplies to a valve controlled manifold system; fluidly connecting the manifold system to the measuring tank; and manipulating the valve controlled manifold system to sequentially provide fluid communication between at least several of the plurality of liquid chemical supplies and the measuring tank to draw preselected amounts of such chemicals in sequence into the measuring tank at less than atmospheric pressure to measure the chemicals in said tank and render the vapors produced by said chemicals in the tank substantially nontoxic by subjecting said vapors to combustion in the internal combustion engine.

14. A method as recited in claim 13 and additionally comprising the step of flushing the manifold system by drawing a preselected amount of surfactant through said manifold system subsequent to said manipulating step.

15. A method as recited in claim 13 and additionally comprising the step of transferring the mixed chemicals from the measuring tank to the storage tank of a tractor spraying rig by providing fluid communication from the measuring tank to an induction manifold, and pumping water through the induction manifold and to the spray tank of a tractor spraying rig so as to draw the mixed chemicals into and entrain the chemicals in the water being pumped.

16. A closed agricultural chemical batching and mixing system mounted on a vehicle such as a sprayer tending truck having an internal combustion engine for motive power, said system comprising a measuring tank; gauge means for indicating the amount of liquid in the measuring tank; a plurality of liquid chemical supply containers, each containing a liquid chemical; a valve controlled manifold system in fluid communcation with each of the liquid chemical supply containers and the measuring tank to control the flow of liquid chemicals from each of the liquid chemical supply containers to the measuring tank; means for fluidly connecting the measuring tank to the intake manifold of the internal combustion engine to create a partial vacuum in the measuring tank and thereby draw preselected amounts of the selected chemicals in sequence from the containers and through the valve controlled manifold system and into the measuring tank and simultaneously render the chemical vapors formed in the measuring tank substantially nontoxic by subjecting them to combustion in the internal combustion engine; a water conduit for dilutant water having an intermediate induction manifold section; and a dump valve controlled conduit providing fluid communication between the bottom of the measuring tank and the induction manifold section to allow the mixed chemicals to be drawn into and entrained in the water passing through the water conduit for transfer of said mixed chemicals to a spray tank on a tractor spraying rig.

17. A system as recited in claim 16 wherein the water conduit is connectable to the spray tank of the tractor spraying rig and includes a pump for pumping water through the water conduit, and wherein the end of the conduit at said spray tank includes a float actuated control valve for terminating the flow of the dilutant water containing the entrained chemicals to said spray tank when the level of said water in said spray tank reaches a predetermined level.

18. A system as recited in claim 17 and additionally comprising a powder box having a door for insertion of powdered chemicals into said box, a first conduit connected to the water conduit downstream of the pump to communicate at least a portion of said water to the powder box, and a second conduit from the powder box to the water conduit upstream of said pump so that a portion of the dilutant water passing through the dilutant water conduit is circulated through the powder box to introduce or suspend the powdered chemicals therein and back into the water supply conduit.

* * * * *